United States Patent [19]
Ruman et al.

[11] Patent Number: 5,924,404
[45] Date of Patent: Jul. 20, 1999

[54] CYLINDER-SPECIFIC SPARK IGNITION CONTROL SYSTEM FOR DIRECT FUEL INJECTED TWO-STROKE ENGINE

[75] Inventors: Mark A. Ruman, Fond du Lac; Douglas R. Potratz, Oshkosh, both of Wis.

[73] Assignee: Brunswick Corporation, Lake Forest, Ill.

[21] Appl. No.: 08/957,144

[22] Filed: Oct. 24, 1997

[51] Int. Cl.⁶ ...................................................... F02P 5/00
[52] U.S. Cl. ................... 123/406.18; 123/406.23
[58] Field of Search ...................... 123/406.18, 406.23, 123/406.35

[56] References Cited

U.S. PATENT DOCUMENTS

| | | | |
|---|---|---|---|
| 4,478,185 | 10/1984 | Obayashi et al. | 123/406.45 |
| 4,480,615 | 11/1984 | Takasu et al. | 123/406.23 |
| 5,090,383 | 2/1992 | Demizu et al. | 123/406.23 |
| 5,313,924 | 5/1994 | Regueiro | 123/456 |
| 5,329,907 | 7/1994 | Nonaka | 123/478 |
| 5,474,045 | 12/1995 | Demizu et al. | 123/418 |
| 5,546,905 | 8/1996 | Fukui | 123/425 |

OTHER PUBLICATIONS

Mercury/Mariner Direct Fuel Injection (DFI), Service Manual, Brunswick Corporation, 1996, pp. 1–90.

*Primary Examiner*—John Kwon
*Attorney, Agent, or Firm*—Andrus, Sceales, Starke & Sawall

[57] ABSTRACT

A direct fuel injected two-stroke engine controls spark ignition timing and/or ignition coil dwell time on a cylinder-specific basis. The engine also preferably controls fuel injection timing and amount and injection/delivery duration on a cylinder-specific basis. Cylinder-specific customization of spark ignition and fuel injection allows better coordination of spark with fuel injection which results in better running quality, lower emissions, etc. Memory in the electronic control unit for the engine preferably includes a high resolution global look-up table that determines global values for spark ignition and fuel injection control based on engine load (e.g. throttle position, manifold air pressure, etc.) and engine speed. Memory in the electronic control unit also includes a plurality of low resolution, cylinder-specific offset value look-up tables from which cylinder-specific offset values for spark ignition and fuel injection can be determined, preferably depending on engine load and engine speed. The offset values are combined with the global values to generate cylinder-specific control signals for spark ignition and fuel injection.

32 Claims, 11 Drawing Sheets

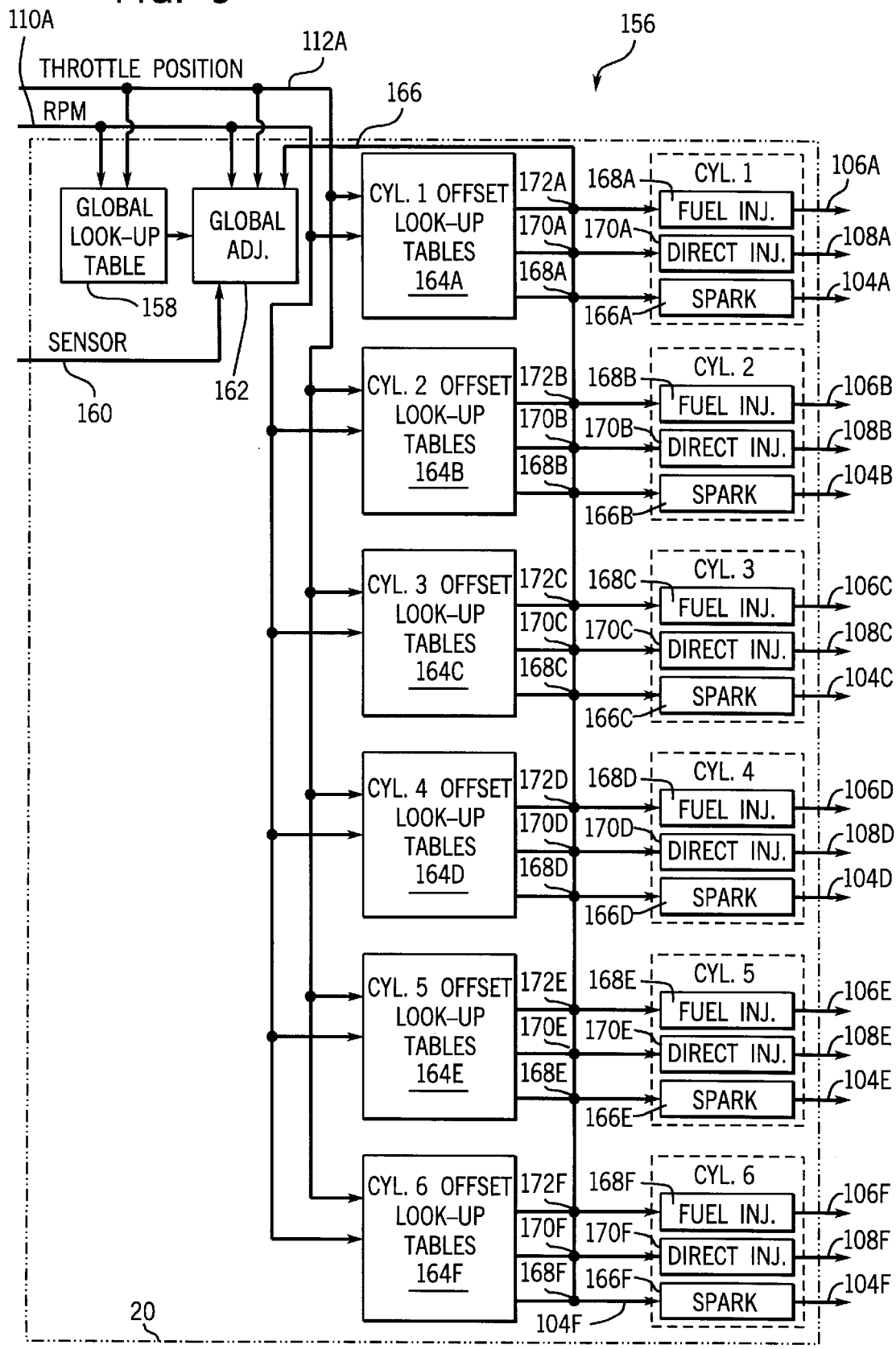

GLOBAL VALUES

-FUEL INJECTOR TIMING AND DURATION
-DIRECT INJECTOR TIMING AND DURATION
-SPARK IGNITION TIMING AND DWELL TIME

CYLINDER-SPECIFIC SPARK IGNITION CONTROL SYSTEM FOR DIRECT FUEL INJECTED TWO-STROKE ENGINE

FIELD OF THE INVENTION

The invention relates to spark advance timing and ignition coil dwell time control in multi-cylinder, two-stroke engines. More specifically, the invention involves the implementation of a control technique in which spark advance timing and/or ignition coil dwell time is customized for each engine cylinder pursuant to cylinder-specific characteristics.

BACKGROUND OF THE INVENTION

By their nature, multi-cylinder marine engines used in outboard motors are compact. This means that the air induction and exhaust systems for these marine engines are not symmetric with respect to the various cylinders in the engine. For this reason as well as others, the operating conditions for the specific cylinders in the two-cycle engine vary greatly. For instance, differences in air motion within the cylinders can substantially affect the amount and quality of air/fuel mixing prior to combustion. Also, due to the different lengths of air intake paths and exhaust tuning paths, the effectiveness of the scavenging process among the cylinders varies, thus changing the quality of preparation in the cylinder before combustion. Further, exhaust and/or induction tuning effects can substantially alter the air/fuel ratio among the various cylinders (e.g. more air is provided to cylinders with relatively greater pressure pulse supercharging). All of these factors substantially alter combustion characteristics from cylinder to cylinder. It is difficult to account for these differences, especially over a wide range of operating conditions.

In addition, cylinder wall temperatures also tend to vary because it is difficult to provide an engine cooling system that maintains all of the cylinder wall temperatures at the same or substantially the same temperature. This is especially difficult because the combustion characteristics of the various cylinders provide different amounts of heat and these variations change with engine speed and load.

In direct fuel injection engines (i.e. fuel injection through the cylinder head), it is known to adjust fuel injection time and quantity on a cylinder-specific basis to account for some of the differences among combustion characteristics for the various cylinders. However, adjustments to fuel timing and quantity on a cylinder-specific basis can have limited affect on improving engine running quality, emissions, etc., especially in direct fuel injected engines. The significance of adjustments to fuel timing and quantity in direct fuel injected engines can be restricted because combustion ignition is sensitive in direct fuel injected engines, and ignition timing and dwell times need to be coordinated with fuel injection to ensure adequate ignition. In direct fuel injected engines, a spray of fuel is injected directly into the combustion chamber and is directed at least in part over the spark plug electrodes. At idle and light loads, the air/fuel mixture in the combustion chamber is dramatically stratified. In other words, the fuel/air mixture within the fuel spray from the fuel injector is fuel rich, whereas the mixture in the remaining portions of the combustion chamber contains virtually no fuel at all. At idle and light loads, it is therefore important that spark ignition occur at a moment in time when there is an appropriate air to fuel ratio in the vicinity of the spark plug electrodes, otherwise combustion misfire is possible. As engine speed and load increases, it is necessary to begin fuel injection into the combustion chamber earlier in the cycle, and this coupled with increased air motion in the cylinder causes mixing of air and fuel throughout the combustion chamber. At high engine speeds and load, the air and fuel are thoroughly mixed to produce a homogeneous and nearly stoichiometric blend in the combustion chamber which is easy to ignite. However, in the transition region (i.e. speeds above idle and light loads but below relatively high engine speeds and loads), the charge may be incompletely mixed in the combustion chamber. It is also likely that the air/fuel ratio in the chamber will be lean. Both of these characteristics in the transition region make ignition difficult unless fuel injection is properly timed with spark ignition.

SUMMARY OF THE INVENTION

The invention is an electronically controlled multi-cylinder, two-stroke internal combustion engine in which spark ignition timing and/or ignition coil dwell times are customized for each cylinder individually based on cylinder-specific characteristics. Customization of spark ignition allows better coordination of spark with fuel injection on a cylinder-specific basis which results in better running quality, lower emissions, and even higher engine power outputs.

It is preferred that the electronic control unit for the engine receive an engine speed signal, preferably from a crankshaft position sensor and encoder, and an engine load signal, preferably from a throttle position sensor. Based on these inputs, the electronic control units generate a plurality of cylinder-specific spark ignition timing control signals, each transmitted to a cylinder spark ignition system to control spark timing for a respective spark plug. It also may be desirable for the electronic control unit to generate a cylinder-specific ignition coil dwell time control signal to control ignition coil dwell time for the respective ignition coil on a cylinder-specific basis. While air flow and combustion characteristics among the various cylinders in the engine vary greatly, especially as engine speed and load varies, the characteristics of each individual cylinder at various speeds and loads is quite often repeatable as a function of engine speed and even more accurately as a function of engine speed and engine load.

To generate the cylinder-specific values, the electronic control unit preferably contains a global look-up table or matrix from which a global value for cylinder spark timing and/or ignition coil dwell time are determined based on the value of the engine load signal and the value of the engine speed signal. Other sensors such as an engine knock sensor, engine coolant temperature sensor, etc. can be used to monitor engine running conditions and/or quality. Input from the engine running condition sensors can be used to adjust the values from the global look-up table on a global basis. In accordance with the invention, the electronic control unit also includes a pre-calibrated cylinder offset matrix for each cylinder. The pre-calibrated cylinder offset matrix contains values for adjusting the global values on a cylinder-specific basis, preferably based on engine load and engine speed, although it may be desirable to base the offsets on additional or other criteria. The electronic control unit combines the global value with each cylinder-specific offset value to generate the cylinder-specific ignition control signals (e.g. the cylinder-specific ignition timing control signals and/or the cylinder-specific ignition coil dwell time control signals).

The preferred ignition system is a distributorless semi-conductor ignition system in which a separate electronic driver and ignition coil are dedicated to each cylinder ignition system. The cylinder-specific ignition control signals are transmitted to the respective electronic driver to control ignition coil discharge timing based on cylinder-specific characteristics and if desirable, ignition coil dwell time also based on cylinder-specific characteristics.

In addition to customizing spark ignition control on a cylinder-specific basis, it may be desirable to control fuel injection on a cylinder-specific basis. In such a system, fuel injection and spark ignition can be coordinated precisely to optimize combustion within the cylinders on an individual basis and improve engine running quality, emissions and power output.

Other features and advantages of the invention may be apparent to those skilled in the art upon inspecting the following drawings and description thereof.

BRIEF DESCRIPTION OF THE DRAWINGS

FIG. 9 is a block diagram illustrating the preferred control scheme for generating cylinder-specific values to control fuel injection and spark ignition in accordance with the invention.

DETAILED DESCRIPTION OF THE DRAWINGS

Figure 1:
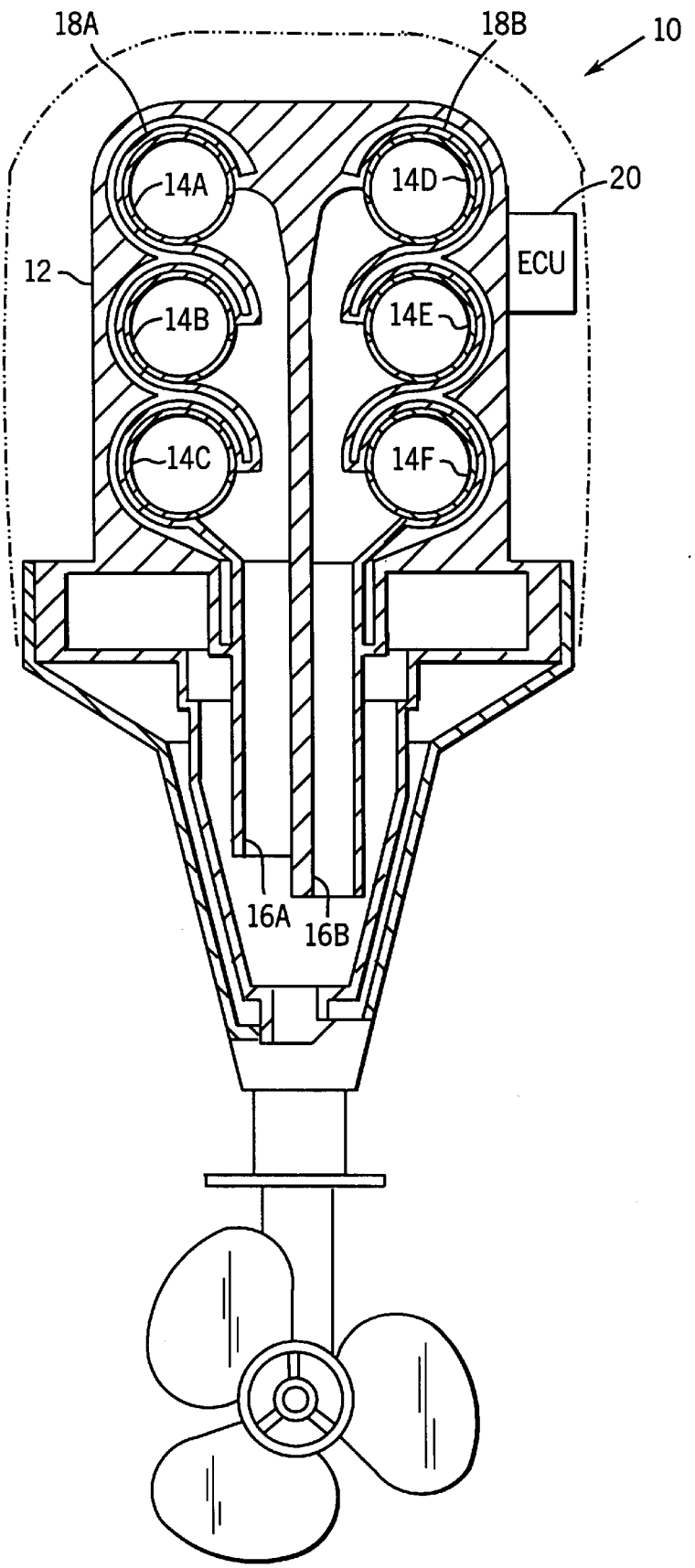
FIG. 1 is a schematic view of an outboard motor having an electronically controlled multi-cylinder, two-stroke internal combustion engine.

FIG. 1 shows an outboard motor 10 having a two-stroke internal combustion engine 12. The engine 12 has six cylinders 14A, 14B, 14C, 14D, 14E and 14F in a V configuration. To promote compact engine design, one of the banks of cylinders 14A, 14B, 14C is offset vertically with respect to the other bank of cylinders 14D, 14E and 14F. The exhaust manifolds for each bank of cylinders are depicted by reference numerals 16A, 16B. Each bank of cylinders is designed to be as similar as possible to the other bank of cylinders. However, air flow characteristics and exhaust pressure pulse tuning characteristics for various cylinders in either bank vary dramatically. Engine cooling passages for each bank of cylinders are depicted by reference numerals 18A, 18B. It is difficult to provide cooling flow rates through the coolant passages 18A and 18B to cool each of the cylinders in each respective bank to the same or similar temperature, especially because combustion characteristics within the cylinders vary greatly both with respect to engine speed and load, and with respect to cylinder location. In accordance with the invention, an electronic control unit 20 is provided to customize spark ignition and fuel injection based on cylinder-specific characteristics to improve the combustion process within each cylinder individually.

Figure 2:
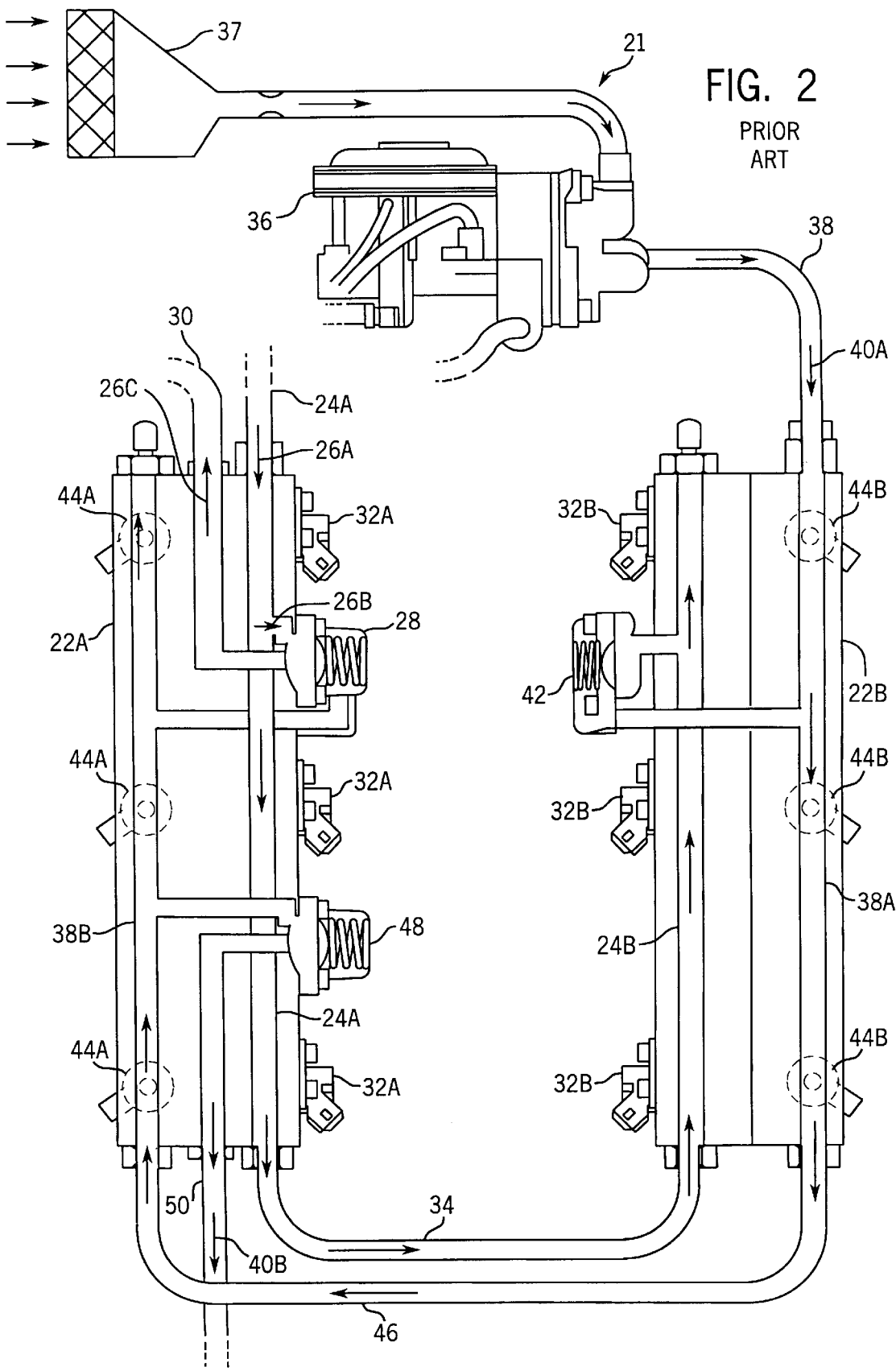
FIG. 2 is a schematic drawing illustrating an air-assisted direct fuel injection system for the engine shown in FIG. 1.
Figure 3:
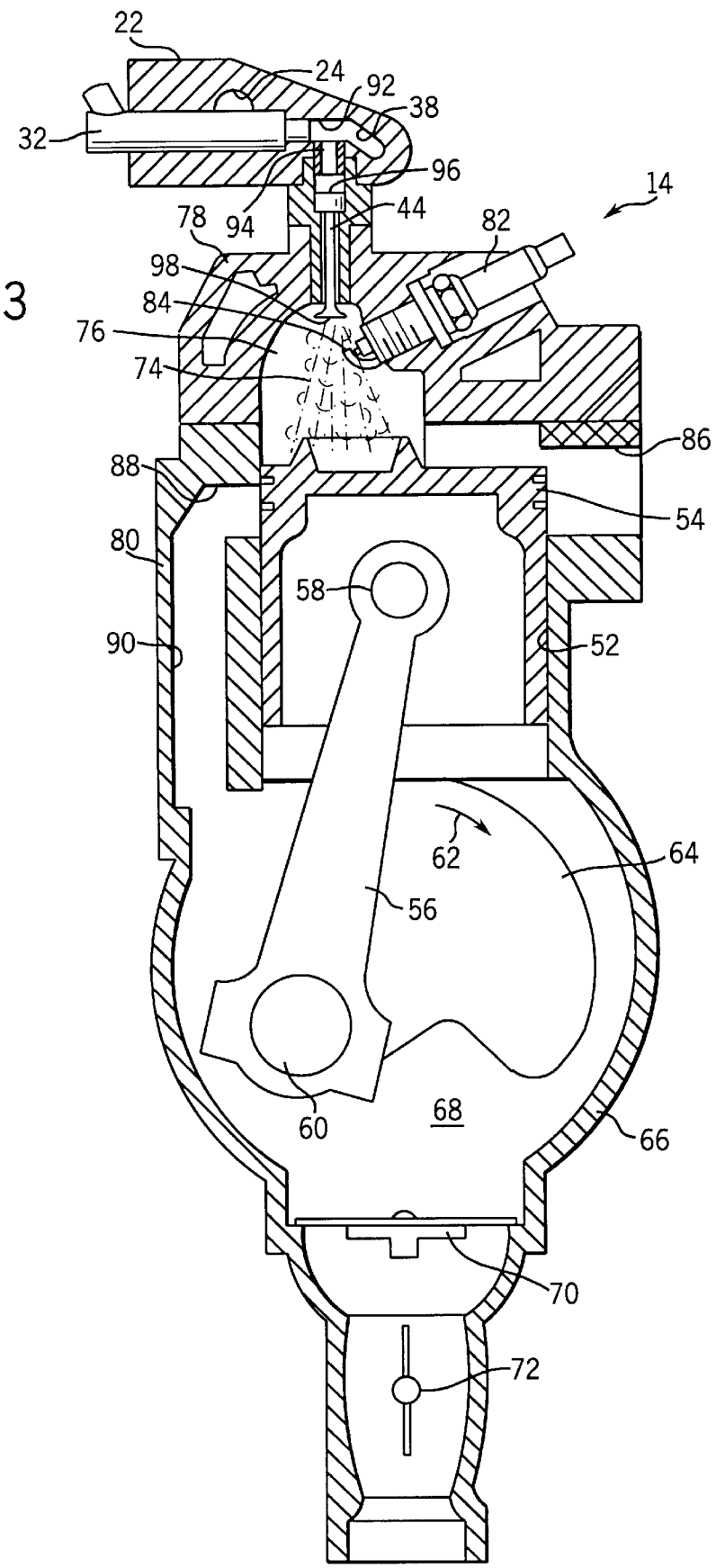
FIG. 3 is a schematic drawing illustrating fuel injection into one of the cylinders of the engine shown in FIG. 1.

In a preferred application of the invention, the fuel injection system is an air-assisted direct fuel injection system as described in FIGS. 2 and 3. Referring in particular to FIG. 2, the air-assisted fuel injection system 21 includes a combined air/fuel rail 22A, 22B for each bank of cylinders 14. Liquid fuel from a fuel pump enters fuel rail 22A via line 24A as depicted by arrow 26A. The fuel flows through the air/fuel rail 22A to a fuel pressure regulator 28 as depicted by arrow 26B. A fuel pressure regulator 28 mounted on air/fuel rail 22A maintains the fuel pressure precisely at 10 psi above the air pressure, i.e. preferably at 90 psi. Excess fuel returns to a fuel vapor separator through line 30 as depicted by arrow 26C. Fuel at 90 psi is supplied to fuel injectors 32A attached to air/fuel rail 22A and is supplied through line 34 to air/fuel rail 22B where the fuel is supplied to fuel injectors 32B attached to air/fuel rail 22B. An air compressor 36 receives intake air from an air inlet 37 and provides compressed air in line 38 to air/fuel rail 22B as depicted by arrow 40A. An air/fuel pressure accumulator mounted on air/fuel rail 22B dampens pressure pulsations in the air and fuel rail passages. Compressed air at 80 psi is provided to direct injectors 44B attached to air/fuel rail 22B and is supplied through line 46 to air/fuel rail 22A to provide compressed air at 80 psi to direct injectors 44A attached to air/fuel rail 22A. An air pressure regulator 48 is mounted to air/fuel rail 22A that regulates air pressure in the air/fuel rails 22A, 22B, preferably at 80 psi. Excess air is discharged through line 50 as depicted by arrow 40B.

Referring to FIG. 3, the operation of one of the cylinders 14 in the engine 12 shown in FIG. 1 is shown in detail. Each cylinder 14 includes a piston cavity 52 through which a piston 54 reciprocates. The crown of the piston 54 may include a bowl or dish. The piston 54 is connected to a piston rod 56 via a piston pin 58. The other end of the piston rod 56 is connected to a crankshaft 60. The piston rod 56 rotates the crankshaft 60 in the direction shown by arrow 62 on counterweight 64 as is known in the art. The crankshaft 60 rotates within a crankcase 66. A separate charging chamber 68 for each cylinder 14 is located in the crankcase 66 below the piston 54. When the piston 54 moves from bottom dead center to top dead center, fresh air is drawn into the charging chamber 68 in the crankcase 66 through reed valve 70. Air flow through the reed valve 70 into the charging chamber 68 is metered by throttle valve 72. As the piston 54 continues to move upward, a spray 74 of fuel is injected from a fuel injection mechanism for the cylinder 14 (e.g. fuel injector 32 and direct injector 44 located in air/fuel rail 22) into a combustion chamber 76 for the cylinder 14. The combustion chamber 76 is located in a cylinder head 78 attached or integral with the engine cylinder block 80. The combustion chamber 76 for each cylinder 14 is coextensive with the respective piston cavity 52. A cylinder spark plug 82 is mounted through the cylinder head 78 so that spark plug ignition electrodes 84 are exposed within the respective combustion chamber 76. The spray of fuel 74 from the fuel injection mechanism is directed at least in part over the spark plug electrodes 84.

When the piston 54 is at or near top dead center, a spark across the spark plug electrodes 84 ignites the fuel/air mixture within the combustion chamber 76. As the piston 54 moves downward after combustion, the piston 54 first begins to uncover the cylinder exhaust port 86 and then begins to uncover transfer port 88. The exhaust scavenging process begins as soon as the piston begins to uncover the transfer port 88. The downward motion of the piston 54 pushes fresh air in the charging chamber 68 through transfer passage 90 in the engine block 80 and through transfer port 88 into the piston cavity 52.

Air supplied by the direct injector 44 is approximately 3% of the total volume required for combustion at wide open throttle. At idle, a substantial amount of combustion air is supplied through the direct injector 44 and the air flowing into the piston cavity 52 and the combustion chamber 76 through the transfer system 88, 90 is used primarily for scavenging exhaust from the cylinder 14. As mentioned previously, air flow rate and tuning variations among cylinders 14 can substantially affect combustion conditions within the respective combustion chambers 76.

The fuel injector 32 is an electromagnetic device driven by a control signal from the electronic control unit 20. Preferably, the fuel injector 32 is a device in which the duration that the fuel injector 32 is open is determined by the pulse width of a fuel injector control signal from the electronic control unit 20. The amount of fuel injected per combustion cycle is determined by the open time of the fuel injector 32 as long as the pressure difference between the fuel rail 24 and the air rail 38 is precisely maintained at a constant pressure differential (e.g. 10 psi). When the fuel injector 32 is activated, fuel is discharged into an interface piece 92 for the fuel injection mechanism. The interface piece 92 guides fuel into a cavity 94 near the top of the direct injector 44. Air from inside the air rail 38 enters the direct injector 44 and mixes with fuel inside the cavity 94. The direct injector 44 is also an electromagnetic device controlled by a control signal from the electronic control unit 20. As the direct injector 44 is activated, an armature 96 connected to the direct injector stem 44 moves to open an additional passage inside of the direct injector 44 which allows additional air from the air rail 38 to mix with the air/fuel mixture in the cavity 94. Contemporaneously, the head 98 of the direct injector 44 becomes unseated. The additional air in the cavity 94 increases the atomization of the air/fuel mixture in the cavity 94 and also forces the air/fuel mixture into the combustion chamber 76. The droplet size of the fuel spray 74 into the combustion chamber 76 typically averages about 10 microns.

Figure 4:
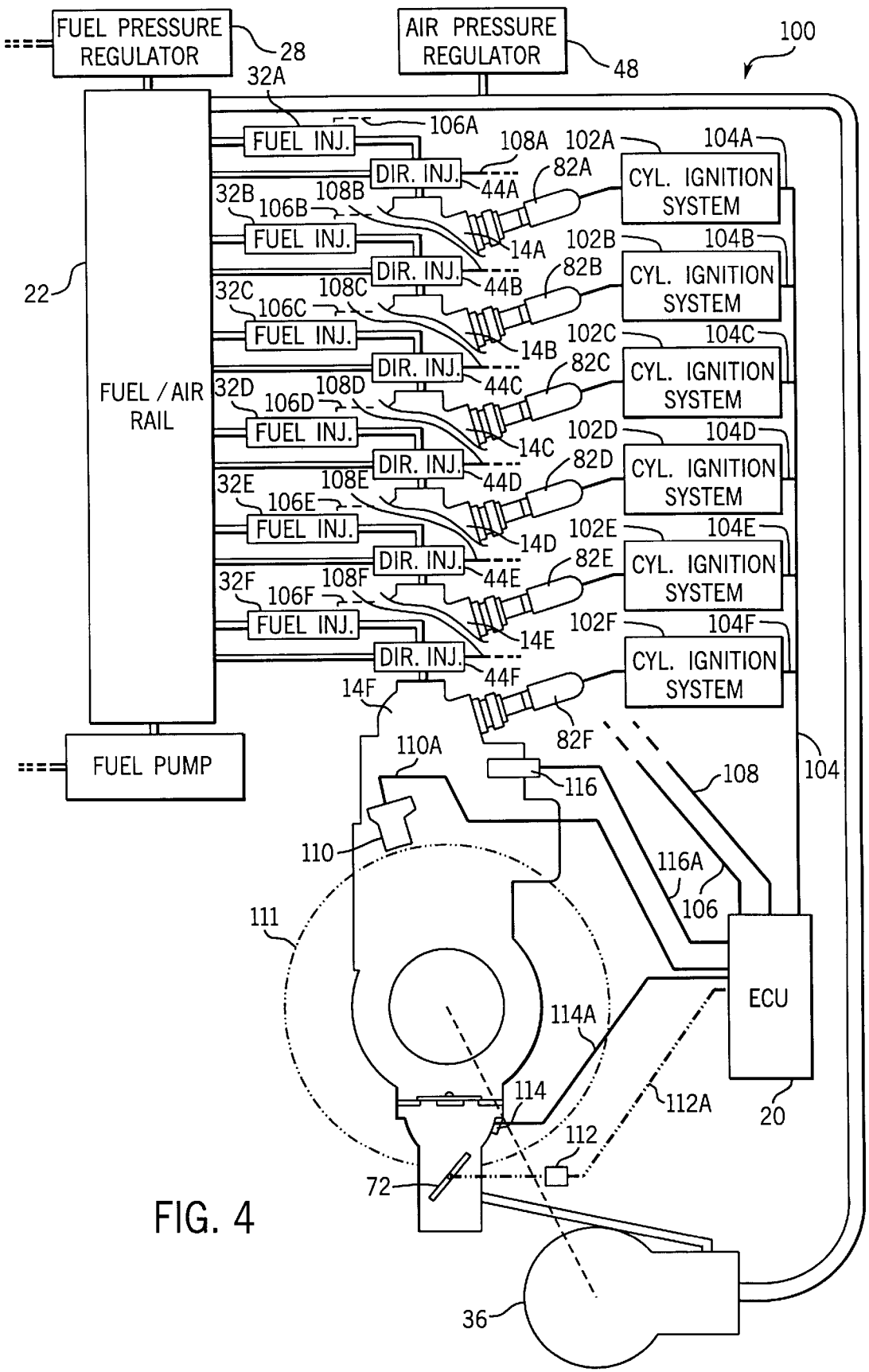
FIG. 4 is a schematic illustration of a fuel injection and spark ignition control system in accordance with the invention.

FIG. 4 schematically illustrates a control system 100 for contemporaneously controlling fuel injection and spark ignition in accordance with the invention. In the system 100, the electronic control unit 20 generates a cylinder-specific spark ignition timing control signal that is transmitted to the respective cylinder spark ignition system 102A, 102B, 102C, 102D, 102E and 102F for the associated spark plug 82A, 82B, 82C, 82D, 82E and 82F. FIG. 4 shows the spark ignition timing control signals being transmitted from the electronic control unit 20 to the respective cylinder ignition systems through lines 104, 104A, 104B, 104C, 104D, 104E and 104F. The electronic control unit 20 also controls the operation of the fuel injectors 32A, 32B, 32C, 32D, 32E and 32F on a cylinder-specific basis by generating a cylinder-specific fuel injection quantity control signal, and transmitting the signal to the respective fuel injectors through lines 106, 106A, 106B, 106C, 106D, 106E and 106F. Likewise, the electronic control unit controls the direct injectors 44A, 44B, 44C, 44D, 44E and 44F by generating cylinder-specific fuel injection timing control signals, and transmitting the signals from the electronic control unit 20 to the direct injectors through lines 108, 108A, 108B, 108C, 108D, 108E and 108F.

Several sensors, for example, sensors 100, 112, 114 and 116, provide input to the electronic control unit 20. FIG. 4 shows some of the sensors used in the preferred system 100. Sensor 110 is a crankshaft position sensor that monitors the position of the engine flywheel 111 and transmits a signal through line 110A to an encoder located at the electronic control unit 20. The encoder determines the engine speed from the signal in line 110A from the crankshaft position sensor. Sensor 112 is a throttle position sensor which monitors the position of the throttle valve 72 and transmits a signal through line 112A to the electronic control unit 20. Sensor 114 is a manifold air pressure sensor which monitors air pressure in the air intake manifold downstream of the throttle valve 72, and transmits a signal through line 114 to the electronic control unit 20. Sensor 116 is an engine temperature sensor which monitors the temperature of engine coolant, and transmits the signal through line 116A to the electronic control unit 20.

Figure 5:
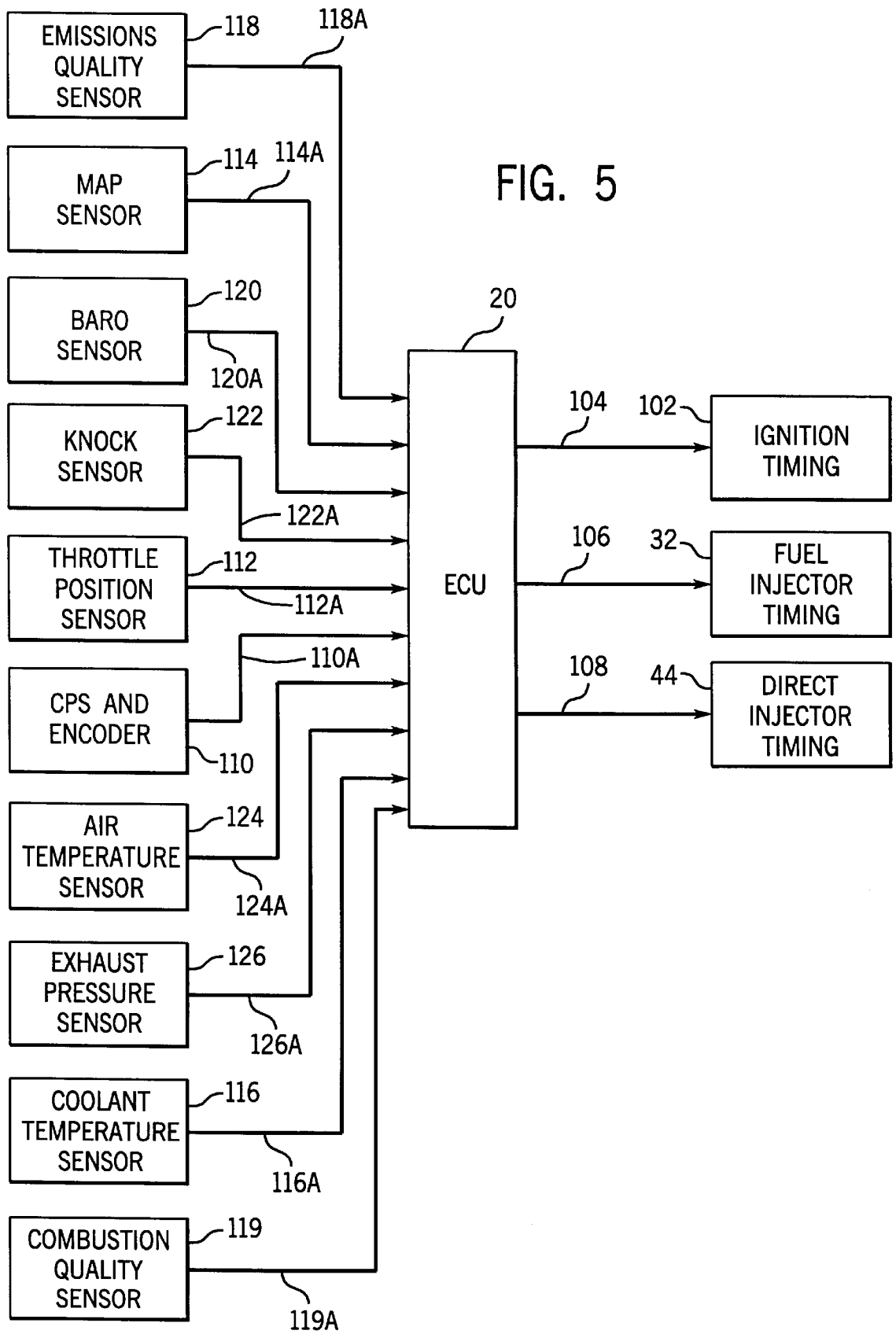
FIG. 5 is a block diagram illustrating sensor inputs and control signal outputs from an electronic control module used to control fuel injection and spark ignition in accordance with the invention.

FIG. 5 schematically illustrates various sensor inputs and control signal outputs from the electronic control unit 20 used to control fuel injection and spark ignition in accordance with the invention. Blocks 110, 112, 114 and 116 correspond respectively to the sensors shown schematically in FIG. 4, namely the crankshaft position sensor/encoder 110, the throttle position sensor 112, the manifold air pressure sensor 114, and the engine coolant temperature sensor 116. In addition, FIG. 5 illustrates that other sensors may be used to monitor engine operating conditions and transmit a generated signal to the electronic control unit 20. For instance, block 118 represents an emissions quality sensor for measuring the emissions quality in the engine exhaust. If the emissions quality sensor 118 is used, the sensor generates a signal that is transmitted through line 118A to the electronic control unit 20. Block 119 represents a combustion quality sensor to measure combustion characteristics in one or more of the engine combustion chambers. Such a combustion quality sensor may embody a system that measures voltage across spark plug electrodes to determine ionization fluctuation of combustion gases at the electrode, or alternatively, can be sensors to measure pressure or temperature within the combustion chamber. Block 120 represents a barometric pressure sensor which, if used, generates a signal that is transmitted through line 120A to the electronic control unit 20. Block 122 represents a knock sensor which, if used, generates a signal that is transmitted through line 122A to the electronic control unit 20. Block 124 represents an air temperature sensor which, if used, generates a signal which is transmitted through line 124A to the electronic control unit 20. Block 126 represents an exhaust pressure sensor which, if used, generates a signal that is transmitted through line 126A to the electronic control unit 20.

Figure 6:
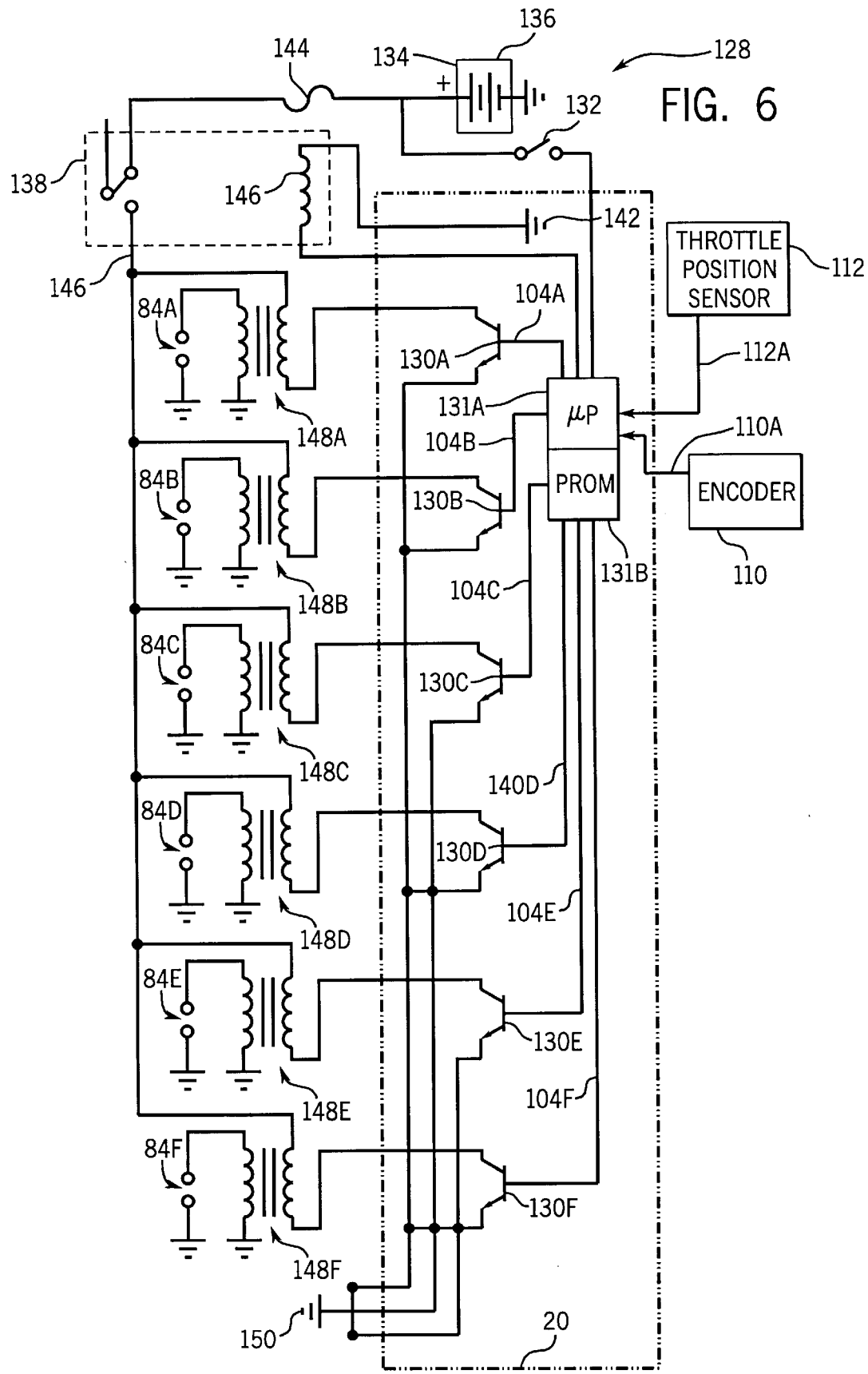
FIG. 6 is an electrical drawing showing the details of an electronically controlled distributed ignition system used in accordance with the invention.

FIG. 6 illustrates a battery-powered, distributorless ignition system that can be used when implementing a spark ignition control system in accordance with the invention. The battery-powered, distributorless spark ignition system 128 in FIG. 6 is controlled by the electronic control unit which contains a microprocessor 131A and an electronic driver 130A, 130B, 130C, 130D, 130E and 130F for each respective cylinder 14A, 14B, 14C, 14D, 14E and 14F.

When the start switch 132 is closed, 12 volts DC is supplied from a positive terminal 134 of the battery 136 through the microprocessor 131A to a main power relay 138. The main power relay 138 is activated by flowing current from the microprocessor 131A through solenoid coil 140 to ground 142. When the main power relay 138 is activated, DC power is provided from the battery 136 through fuse 144 and through the relay 138 to line 146. Line 146 provides DC power to the positive side of the primary windings of the ignition coils 148A, 148B, 148C, 148D, 148E and 148F. The microprocessor 131A controls spark timing (angle) and ignition coil dwell time by transmitting spark ignition control signals through lines 104A, 104B, 104C, 104D, 104E and 104F to the respective electronic driver 130A, 130B, 130C, 130D, 130E and 130F for the respective ignition coil 148A, 148B, 148C, 148D, 148E and 148F. Based on information from the encoder 110, the throttle position 112, and possibly other sensors, the microprocessor 131A calculates when to trigger the respective ignition drivers 130A, 130B, 130C, 130D, 130E and 130F to remove ground 150 from the negative side of the primary windings of the respective ignition coils 148A, 148B, 148C, 148D, 148E and 148F. With the ground path removed, the magnetic field within the respective ignition coil 148A, 148B, 148C, 148D, 148E and 148F caused by flowing power through the primary winding collapses, and a high tension voltage is induced in the secondary winding of the respective coil. The high tension voltage in the secondary winding of the respective ignition coil 148A, 148B, 148C, 148D, 148E and 148F is supplied to the spark plug to provide a spark across the gap between the respective spark plug electrodes 84A, 84B, 84C, 84D, 84E and 84F. Spark ignition timing is characterized by the moment in time that ground 150 is removed from the respective ignition coil 148A, 148B, 148C, 148D, 148E and 148F. Ignition coil dwell time is the amount of time that ground 150 is provided to the respective ignition coil 148A, 148B, 148C, 148D, 148E and 148F before the respective ignition coil is discharged.

Figure 7:
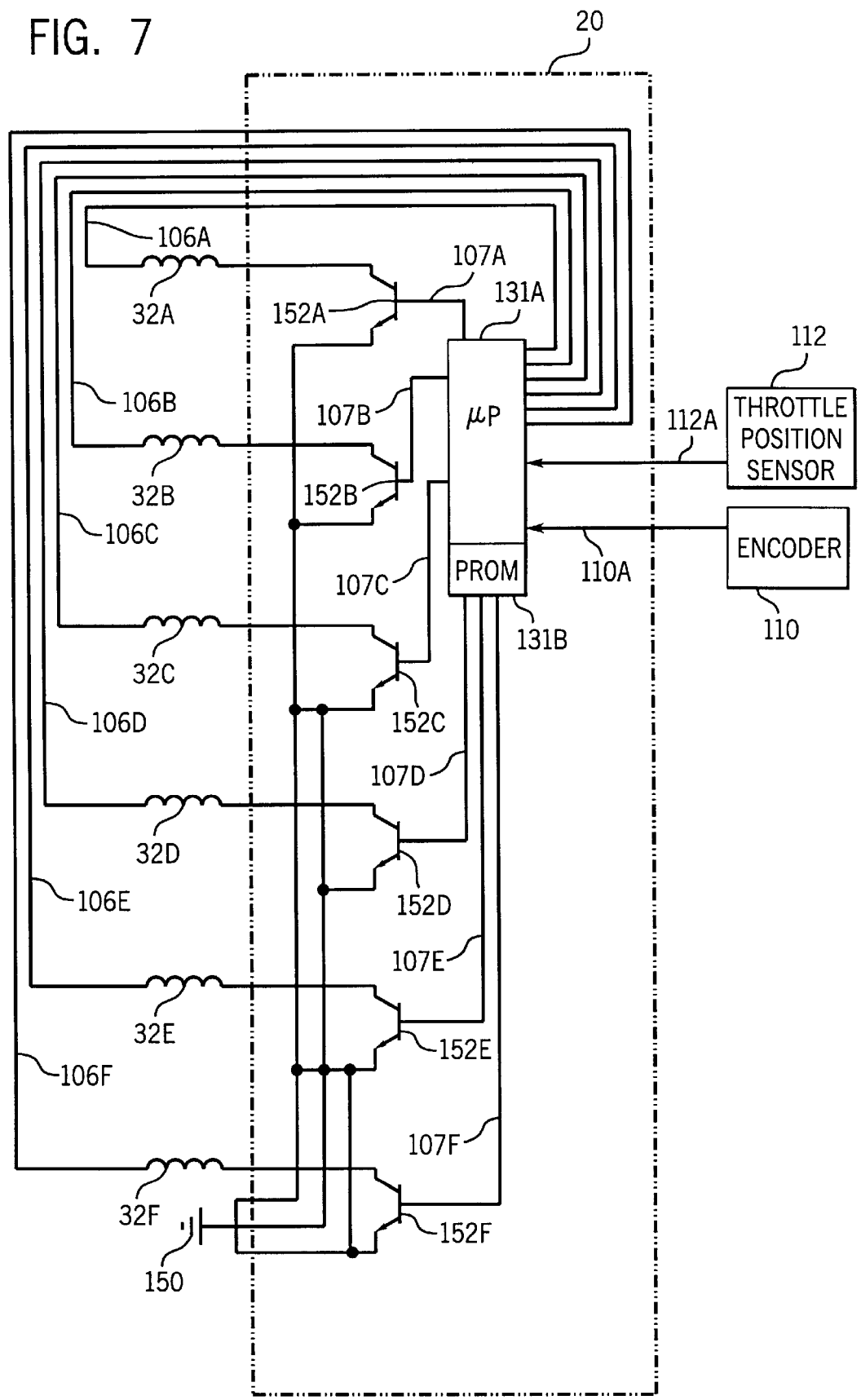
FIG. 7 is an electrical drawing showing the electronic control of fuel injectors in accordance with the invention.

The microprocessor 131A in the electronic control unit 20 also controls the operation of the fuel injectors 32 and the direct injectors 44. FIG. 7 is a schematic drawing showing the electronic control system for the fuel injectors 32A, 32B, 32C, 32D, 32E and 32F. Each fuel injector 32A includes a solenoid that is energized from power supplied from the microprocessor 131A when the respective electronic injector driver 152A, 152B, 152C, 152D, 152E and 152F is triggered. In particular, the microprocessor 131A provides DC power through lines 106A, 106B, 106C, 106D, 106E and 106F to the respective fuel injector solenoid 32A, 32B, 32C, 32D, 32E and 32F. The fuel injectors 32A, 32B, 32C, 32D, 32E and 32F are opened by providing ground 150 to the fuel injector solenoid. The microprocessor 131A controls a fuel injection driver 152A, 152B, 152C, 152D, 152E and 152F for each respective fuel injector 32A, 32B, 32C, 32D, 32E and 32F through signals transmitted through lines 107A, 107B, 107C, 107D, 107E and 107F, respectively. The amount of fuel supplied by the respective fuel injector 32A, 32B, 32C, 32D, 32E and 32F is determined by the amount of time that the respective driver 152A, 152B, 152C, 152D, 152E and 152F is triggered to supply ground 150 to the respective fuel injector solenoid.

Figure 8:
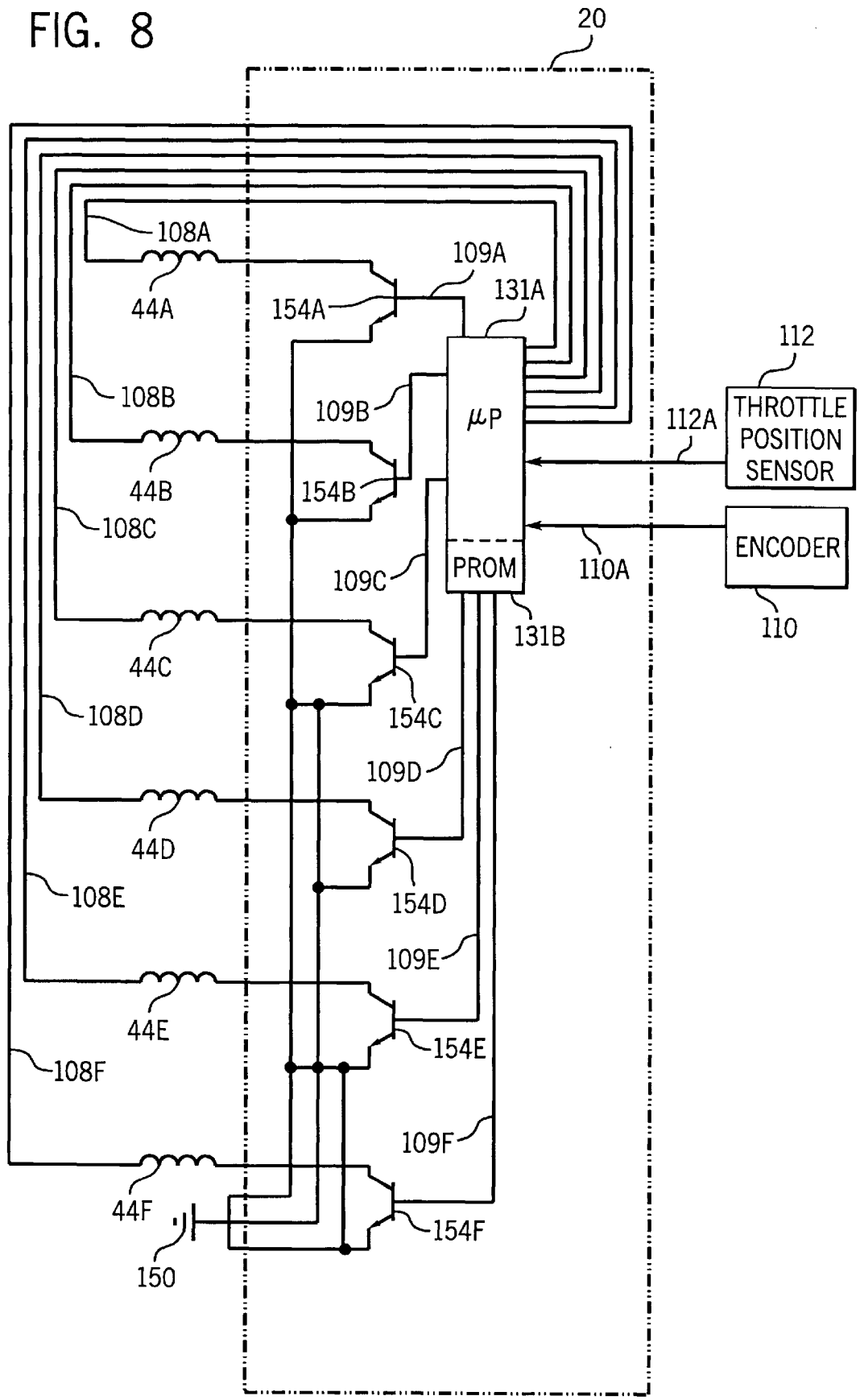
FIG. 8 is an electrical drawing showing electronic control of direct injectors in accordance with the invention.

The direct injectors 44 are preferably controlled by the microprocessor 131A in a manner similar to the fuel injectors 32A. FIG. 8 is an electrical drawing of the electronic control system for the direct injectors 44A, 44B, 44C, 44D, 44E and 44F. The direct injectors 44 are controlled by the microprocessor 131A which triggers direct injector drivers 154A, 154B, 154C, 154D, 154E and 154F in accordance with fuel injection timing control signals transmitted from the microprocessor 131A to the respective driver 154A, 154B, 154C, 154D, 154E and 154F through line 109A, 109B, 109C, 109D, 109E and 109F, respectively. Fuel injection timing is characterized by the moment in time that ground 150 is provided to the respective direct injector solenoid.

In addition to the microprocessor 131A and the electronic drivers, the electronic control unit 20 includes a clock and memory, e.g. read-only memory, random access memory, and programmable read-only memory. Pre-calibrated parameter look-up tables or matrices programmed into the memory of the electronic control unit 20 are used to determine the spark ignition control signals, line 104, FIG. 4, the fuel injection timing control signals, line 106, FIG. 4, and the fuel injection quantity control signals, line 108 in FIG. 4. These parameter look-up tables or matrices are preferably located in read-only or programmable read-only memory 131B.

FIG. 9 is a block diagram illustrating the preferred control scheme for generating cylinder-specific values to control fuel injection and spark ignition in accordance with the invention. The primary purpose of the control scheme 156 is to control spark ignition timing and/or ignition coil dwell time independently for each cylinder 14A, 14B, 14C, 14D, 14E and 14F based on cylinder-specific characteristics. In addition, the control scheme 156 determines fuel injector timing and duration of time in which the fuel injector is open, and direct injector timing and delivery duration of time in which the direct injector is open, for each cylinder 14A, 14B, 14C, 14D, 14E and 14F based on cylinder-specific characteristics.

Figures 10A, 10B:
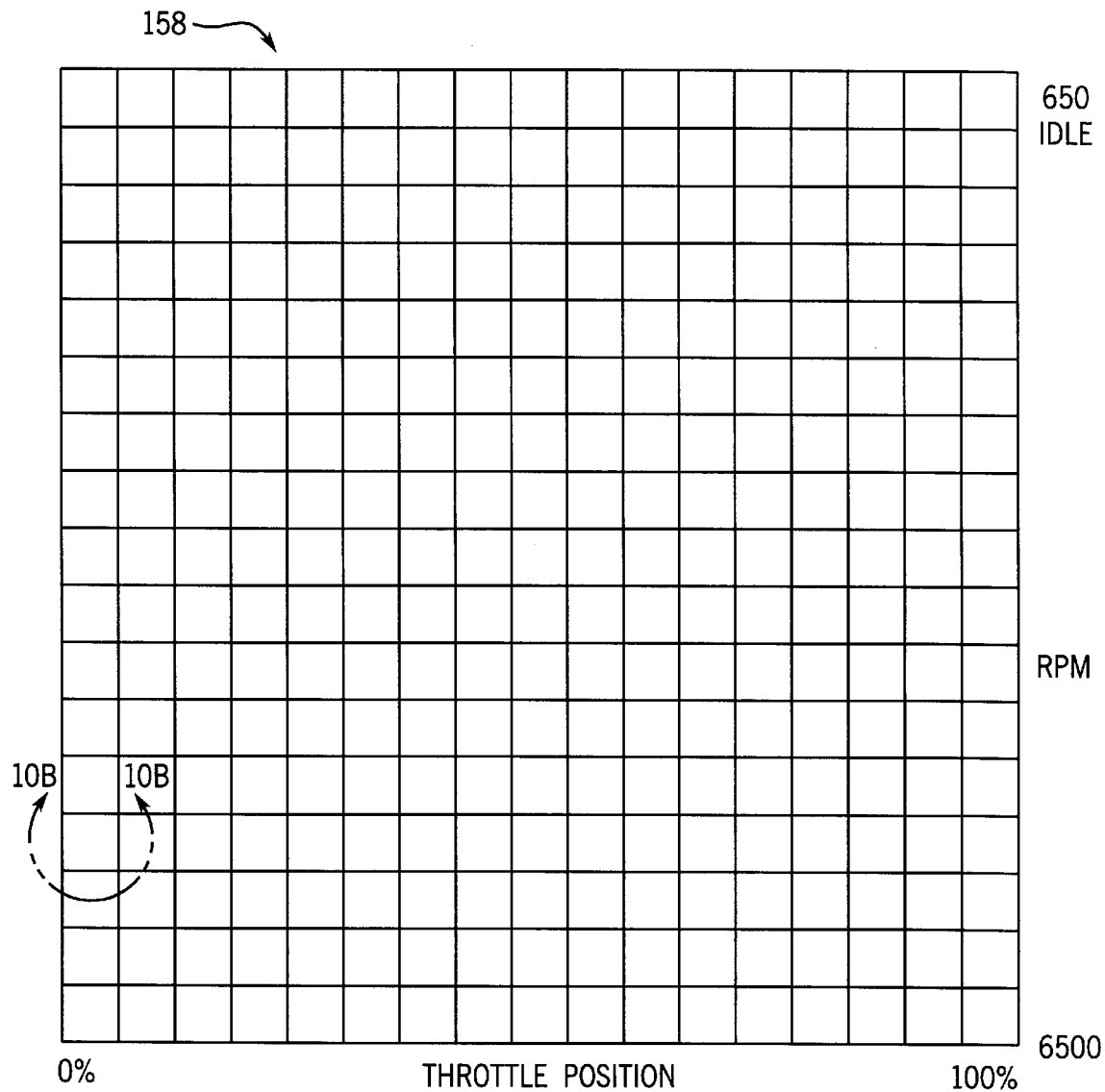
FIGS. 10A and 10B schematically illustrate an example of a global look-up table used to determine global values for fuel injection and spark ignition in the electronic control module.

In the control scheme 156, an engine speed signal in line 110A and an engine load signal in line 112A input the electronic control unit 20 and are used for several purposes. The engine load signal is preferably a throttle position signal, although other signals representing engine load can be used in accordance with the invention. Initially, the engine speed signal and the throttle position signal are used by a global lookup table, block 158, from which global values for spark ignition timing and dwell time, fuel injector timing and duration, and direct injector timing and duration are determined. FIGS. 10A and 10B illustrate an example of a global look-up table 158 programmed into memory for the electronic control unit 20. Referring briefly to FIGS. 10A and 10B, the global look-up table 158 in FIG. 10A is a 17×17 data parameter matrix having global values for spark ignition timing and dwell time, fuel injector timing and duration, and direct injector timing and duration mapped for each combination of throttle position v. engine rpm. Throttle position is mapped along the horizontal axis from 0% to 100% in 17 increments. Engine speed is mapped along the vertical axis from 650 rpm (e.g. idle) to 6500 rpm (e.g. slightly above rated rpm for the engine) in 17 increments. The matrix entries in the global look-up table are pre-calibrated for each specific model of engine, preferably at the factory. The global values are selected to optimize engine running quality, emissions, etc. as much as possible without customizing fuel injection and spark ignition control on a cylinder-specific basis.

Referring again to FIG. 9, the electronic control unit 20 also preferably receives an engine running condition signal through line 160. The engine running condition signal 160 is generated by an engine running condition sensor such as a knock sensor 122, an emissions quality sensor 118, an exhaust pressure sensor 126, etc. Block 162 in FIG. 9 represents means for adjusting the values of the global spark ignition timing and dwell time values, the global fuel injector timing and duration values, and the global direct injector timing and duration values on a global basis depending on the engine running condition sensor. These global adjustments are also made in accordance with the engine speed signal in line 110A and/or the throttle position signal in line 112A. Global adjustments made to the global values are implemented when unusual running conditions occur. Under normal running conditions, it will not be necessary to globally adjust the global values. However, if for instance the engine running condition sensor is a knock sensor 122 and the knock sensor 122 detects engine knock at high engine speed, it may be desirable to retard spark advance timing globally approximately 3°. The global adjustments can be implemented by small look-up tables and/or a simple algorithm. If more than one running condition sensor is used in the system, it may be desirable to include separate global adjustment means 162 for each running condition sensor.

Figures 11A, 11B:
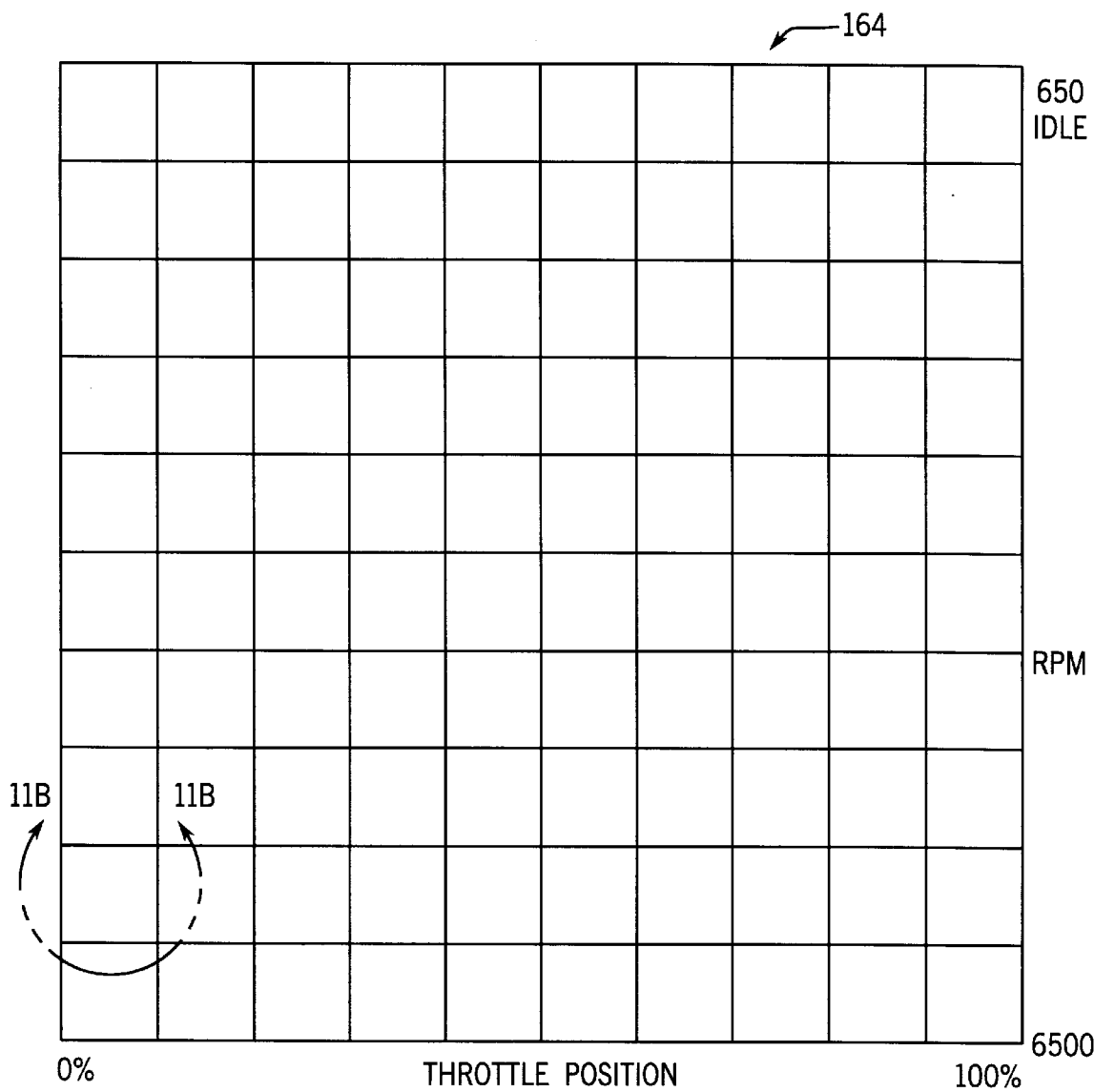
FIGS. 11A and 11B schematically illustrate an example of cylinder-specific offset look-up tables used to determine cylinder offset values for fuel injection and spark ignition based on cylinder-specific characteristics in accordance with the invention.

To customize spark ignition and/or fuel injection in accordance with the invention, the memory in the electronic control unit 20 is also programmed to contain a plurality of pre-calibrated cylinder offset look-up tables or matrices 164A, 164B, 164C, 164D, 164E and 164F. Each of the pre-calibrated cylinder offset tables determines cylinder-specific offset values for spark ignition timing and dwell time, fuel injector timing and duration, and direct injector timing and duration. FIGS. 11A and 11B show an example of one of the cylinder-specific offset look-up tables 164A, 164B, 164C, 164D, 164E and 164F. In FIG. 11A, the cylinder-specific offset values are based on engine throttle position and engine speed. In the cylinder offset matrices 164, throttle position values from 0% to 100% are mapped along the horizontal axis in ten increments. Engine speed values are mapped along the vertical axis from idle (e.g. 650 rpm) to slightly above full rated engine speed (e.g. 6500 rpm) in ten increments. Note that the resolution for the cylinder-specific offset matrices 164 (10×10) is substantially less than the resolution for the global look-up table 158 (17×17). It may be desirable in some applications to increase the resolution of both the global look-up table 158 and the cylinder offset look-up tables 164A, 164B, 164C, 164D, 164E and 164F, however, in most practical systems it is important to conserve memory in the electronic control unit 20. Conserving memory in the electronic control unit 20 is accomplished most effectively by reducing the resolution of the cylinder-specific offset look-up tables 164A, 164B, 164C, 164D, 164E and 164F. As shown in FIGS. 9, 11A and 11B, the cylinder-specific offset values depend on both the engine load signal (e.g. the throttle position signal) and the value of the engine speed signal. In some applications, it may be desirable to base cylinder-specific offset values on additional or different criteria such as that shown in FIG. 5. In any event, the cylinder-specific look-up tables 164A, 164B, 164C, 164D, 164E and 164F are preferably pre-calibrated at the factory.

Referring again to FIG. 9, the global values for spark ignition timing and dwell time, fuel injector timing and duration and direct injector timing and duration shown schematically in line 166 are combined with the appropriate cylinder-specific offset values for spark ignition timing and dwell time, fuel injector timing and duration, and direct injector timing and duration from the respective cylinder-specific offset look-up table 164A, 164B, 164C, 164D, 164E and 164F. Junctions 168A, 168B, 168C, 168D, 168E and 168F represent the combination of the global value for spark ignition timing and dwell time with the respective cylinder offset value for spark ignition timing and dwell time to generate cylinder-specific values for spark ignition timing and dwell time, blocks 166A, 166B, 166C, 166D, 166E and 166F. Based on the cylinder-specific values for spark ignition timing and dwell times (blocks 166A, 166B, 166C, 166D, 166E and 166F), cylinder-specific spark ignition control signals are transmitted through lines 104A, 104B, 104C, 104D, 104E and 104F from the microprocessor 131A in the electronic control unit 20 to the respective spark ignition drivers 130A, 130B, 130C, 130D, 130E and 130F to control spark ignition timing and ignition coil dwell time on a cylinder-specific basis. In a similar manner, FIG. 9 illustrates that the microprocessor 131A combines the global value for the fuel injector timing and duration with the respective cylinder offset value for fuel injector timing and duration to generate cylinder-specific values for fuel injector timing and duration, blocks 168A, 168B, 168C, 168D, 168E and 168F. Junctions 172A, 172B, 172C, 172D, 172E and 172F represent the combination of the global values for fuel injector timing and duration to the respective cylinder offset values for fuel injector timing and duration. Based on the cylinder-specific values for fuel injection timing and duration (blocks 168A, 168B, 168C, 168D, 168E and 168F), fuel injector control signals are transmitted from the microprocessor 131A through lines 106A, 106B, 106C, 106D, 106E and 106F to the respective electronic fuel injector driver 152A, 152B, 152C, 152D, 152E and 152F to control fuel injector timing and duration on a cylinder-specific basis. Likewise, the global values for direct injector timing and duration are combined with the respective cylinder offset values for direct injector timing and duration as represented by junctions 170A, 170B, 170C, 170D, 170E and 170F to generate cylinder-specific values for direct injector timing and duration, blocks 170A, 170B, 170C, 170D, 170E and 170F. Based on the cylinder-specific values for direct injector timing and duration (blocks 170A, 170B, 170C, 170D, 170E and 170F), the microprocessor 131A in the electronic control unit 20 transmits cylinder-specific direct injector control signals through lines 108A, 108B, 108C, 108D, 108E and 108F to the respective direct injector electronic driver 154A, 154B, 154C, 154D, 154E and 154F to control direct injector timing and duration on a cylinder-specific basis.

The invention as described in conjunction with the drawings describes both a preferred application of the invention and a preferred embodiment of the invention. Modifications, alternatives or equivalents to that described in the drawings should be considered to fall within the scope of the following claims. For instance, cylinder-specific values for controlling spark ignition and fuel injection are generated in the preferred embodiment using global look-up tables, global adjustment means, and cylinder-specific offset value look-up tables, however, if the electronic control unit 20 has sufficient memory, the invention can be carried out using a separate high resolution look-up table for each cylinder without using a high resolution global look-up table and low resolution cylinder-specific offset look-up tables. Global adjustment means used during unusual running conditions could be replaced by cylinder-specific adjustment means by adopting cylinder-specific engine running condition sensors and/or sensing methods. Furthermore, in some applications it may even be possible to replace look-up tables with algorithms. In addition, the invention may be used in other types of fuel injection systems for two-cycle engines, such as cylinder wall fuel injection systems.

We claim:

1. A multi-cylinder, two-stroke internal combustion engine comprising:

a plurality of engine cylinders each coextensive with a respective combustion chamber;

a cylinder spark ignition system for each cylinder, each cylinder spark ignition system having a spark plug mounted to the engine so that a spark plug ignition electrode is exposed within the respective combustion chamber;

an engine speed sensor that monitors an engine revolution rate and generates an engine speed signal in response thereto; and an electronic control unit that inputs the engine speed signal and generates a cylinder-specific spark ignition timing control signal that is transmitted to each cylinder spark ignition system to control spark timing for the respective spark plug electrode, wherein the electronic control unit contains a set of spark ignition timing control parameters pre-calibrated for each respective cylinder and determines spark timing for each respective spark plug electrode based at least in part on the spark ignition timing control parameters which are pre-calibrated for the respective cylinder.

2. A multi-cylinder, two-stroke internal combustion engine as recited in claim 1 further comprising:

an engine load sensor that monitors the engine load and generates an engine load signal in response thereto;

wherein the engine load signal inputs the electronic control unit.

3. A multi-cylinder, two-stroke internal combustion engine as recited in claim 2 wherein the engine load sensor is a throttle position sensor that monitors the position of the throttle on the engine as an indication of engine load and generates the engine load signal in response thereto.

4. A multi-cylinder, two-stroke internal combustion engine as recited in claim 1 wherein each cylinder spark ignition system comprises:

a spark plug mounted through the cylinder head, and a dedicated ignition coil and electronic driver for each spark plug, wherein the spark ignition timing control signals generated by the electronic control unit are transmitted to the respective electronic driver to control ignition coil discharge timing.

5. A multi-cylinder, two-stroke internal combustion engine as recited in claim 4 wherein the spark ignition timing control signals generated by the electronic control unit and transmitted to the respective electronic drivers also control ignition coil dwell times.

6. A multi-cylinder, two-cycle internal combustion engine as recited in claim 1 wherein the engine speed sensor comprises a crankshaft position sensor and an encoder.

7. A multi-cylinder, two-cycle internal combustion engine as recited in claim 1 further comprising:

a fuel injection mechanism for each cylinder, each supplying fuel to one of the respective engine cylinders; and wherein the electronic control unit further generates a cylinder-specific fuel injection timing control signal that is transmitted to each cylinder fuel injection mechanism to control fuel injection timing into the respective cylinder, the electronic control unit containing a set of fuel injection timing control parameters pre-calibrated for each respective cylinder and determining fuel injection timing for each respective cylinder based at least in part on the fuel injection timing control parameters which are pre-calibrated for the respective cylinder.

8. A multi-cylinder, two-stroke internal combustion engine as recited in claim 1 further comprising:

a fuel injection mechanism for each cylinder, each supplying fuel to one of the respective engine cylinders; and wherein the electronic control unit further generates a cylinder-specific fuel injection quantity control signal that is transmitted to each cylinder fuel injection mechanism to control fuel injection quantity into the respective cylinder, the electronic control unit containing a set of fuel injection quantity control parameters pre-calibrated for each respective cylinder and determining fuel injection quantity for each respective cylinder based at least in part on the fuel injection quantity control parameters which are pre-calibrated for the respective cylinder.

9. A multi-cylinder, two-stroke internal combustion engine as recited in claim 7 wherein the electronic control unit also generates a cylinder-specific fuel injection quantity control signal that is transmitted to each cylinder fuel injection mechanism to control the amount of fuel injected into each respective cylinder, the electronic control unit containing a set of fuel injection quantity control parameters pre-calibrated for each respective cylinder and determining the quantity of fuel injection for each respective cylinder based at least in part on the fuel injection quantity control parameters which are pre-calibrated for the respective cylinder.

10. A multi-cylinder, two-cycle internal combustion engine as recited in claim 7 wherein each fuel injection mechanism is an air-assisted fuel injection mechanism including a fuel injector and direct injector for each cylinder.

11. A multi-cylinder, two-cycle internal combustion engine as recited in claim 10 wherein the electronic control unit outputs a cylinder-specific fuel injection quantity control signal to each respective fuel injector, and also outputs a cylinder-specific fuel injection timing control signal to each respective direct injector.

12. A multi-cylinder, two-stroke internal combustion engine comprising:

a plurality of engine cylinders each coextensive with a respective combustion chamber;

a cylinder spark ignition system for each cylinder, each cylinder spark ignition system having a spark plug mounted to the engine so that a spark plug ignition electrode is exposed within the respective combustion chamber and a dedicated ignition coil and electronic driver for each spark plug;

an engine rpm sensor that monitors an engine revolution rate and generates an engine rpm signal in response thereto; and an electronic control unit that inputs the rpm signal and generates a cylinder-specific ignition coil dwell time control signal that is transmitted to the respective electronic driver to control ignition coil dwell time for the respective ignition coil, wherein the electronic control unit contains a set of ignition coil dwell time control parameters pre-calibrated for each cylinder and determines ignition coil dwell time for each respective ignition coil based at least in part on the ignition coil dwell time control parameters which are pre-calibrated for the respective cylinder.

13. A multi-cylinder, two-stroke internal combustion engine as recited in claim 12 further comprising:

an engine load sensor that monitors engine load and generates an engine load signal in response thereto;

wherein the engine load signal inputs the electronic control unit.

14. A multi-cylinder, two-stroke internal combustion engine as recited in claim 13 wherein the engine load sensor is a throttle position sensor that measures the position of the engine throttle to indicate engine load and generates the engine load signal in response thereto.

15. In multi-cylinder, fuel injected two-cycle internal combustion engine, a method of contemporaneously controlling spark ignition and fuel injection, the method comprising the steps of:

monitoring engine revolution rate and generating an engine speed signal in response thereto;

sensing engine load and generating an engine load signal in response thereto;

determining a global value for cylinder spark advance timing from the value of the engine load signal and the value of the engine rpm signal;

determining cylinder-specific spark advance timing offset values for each cylinder based on cylinder-specific characteristics;

combining the global value for the cylinder-specific spark advance timing with each respective cylinder-specific offset spark advance timing value to generate a separate cylinder-specific spark advance timing control signal;

transmitting the cylinder-specific spark advance timing control signals to a cylinder spark ignition system for each respective cylinder;

determining a global value for cylinder fuel injection timing from the value of the engine load signal and the value of the engine rpm signal;

determining cylinder-specific fuel injection timing offset values for each cylinder based on cylinder-specific characteristics;

combining the global value for cylinder fuel injection timing with each respective cylinder-specific offset fuel injection timing value to generate a separate cylinder-specific fuel injection timing control signal; and transmitting the cylinder-specific fuel injection timing control signals to a fuel injection mechanism for each respective cylinder.

16. A method as recited in claim 15 further comprising the steps of:

determining a global value for fuel injection quantity from the value of the engine load signal and the value of the engine speed signal;

determining cylinder-specific fuel injection quantity offset values for each cylinder based on cylinder-specific characteristics;

combining the global value for the cylinder fuel injection quantity with each respective cylinder-specific offset fuel injection quantity value to generate a separate cylinder-specific fuel injection quantity control signal for each cylinder; and transmitting the cylinder-specific fuel injection quantity control signals to the cylinder fuel injection mechanism for each respective cylinder.

17. A method as recited in claim 16 wherein the fuel injection mechanism is an air assisted fuel injection mechanism comprising a fuel injector and a direct injector, and the cylinder-specific fuel injection quantity control signals control the operation of fuel injectors for the respective cylinder fuel injection mechanisms; and the cylinder-specific fuel injection timing control signals control the operation of direct injectors for the respective cylinder fuel injection mechanisms.

18. A method as recited in claim 17 wherein the cylinder-specific fuel injection timing control signals control direct injector timing and the delivery duration of the direct injector.

19. A method as recited in claim 15 further comprising the steps of:

determining a global value for ignition coil dwell time from the value of the engine load signal and the value of the engine speed signal;

determining cylinder-specific ignition coil dwell time offset values for each cylinder based on cylinder-specific characteristics;

combining the global value for the cylinder ignition coil dwell time with the respective cylinder-specific offset ignition coil dwell time values to generate a separate cylinder-specific ignition coil dwell time control signal for each cylinder; and transmitting the cylinder-specific ignition coil dwell time control signals to the spark ignition system for each respective cylinder.

20. A method as recited in claim 15 further comprising the steps of:

monitoring engine running conditions and generating an engine running condition signal in response thereto;

adjusting the global spark advance timing value on a global basis based on the engine running condition signal before combining the global value for the spark advance timing with each respective cylinder-specific offset spark advance timing value.

21. A method as recited in claim 19 further comprising the steps of:

monitoring engine running conditions and generating an engine running condition signal in response thereto;

adjusting the global ignition coil dwell time value on a global basis based on the engine running condition signal before combining the global value for the ignition coil dwell time with each respective cylinder-specific offset ignition coil dwell time value.

22. A multi-cylinder, two-stroke internal combustion engine comprising:

a plurality of engine cylinders each coextensive with a respective combustion chamber;

a cylinder spark ignition system for each cylinder, each cylinder spark ignition system having a spark plug mounted to the engine so that a spark plug ignition electrode is exposed within the respective combustion chamber;

an engine load sensor that monitors the engine load and generates an engine load signal in response thereto;

an engine speed sensor that monitors an engine revolution rate and generates an engine speed signal in response thereto; and an electronic control unit that inputs the engine speed signal and the engine load signal and generates a cylinder-specific spark ignition timing control signal that is transmitted to each cylinder spark ignition system to control spark timing for the respective spark plug electrode, wherein the electronic control unit determines spark timing for each respective spark plug electrode based on cylinder-specific characteristics; and wherein the electronic control unit contains:

a global spark ignition timing matrix from which a global value for cylinder spark timing is determined from the value of the engine load signal and the value of the engine speed signal;

a plurality of pre-calibrated cylinder offset spark ignition timing matrices from which cylinder-specific offset values for adjusting spark timing from the global value are determined; and means for combining the global value with the cylinder-specific offset values to generate the cylinder-specific ignition timing control signals.

23. A multi-cylinder, two-stroke internal combustion engine as recited in claim 22 wherein the electronic control unit contains at least one pre-calibrated cylinder offset spark ignition timing matrix for each engine cylinder.

24. A multi-cylinder, two-stroke internal combustion engine as recited in claim 22 where in the cylinder-specific values for adjusting spark timing are determined from the value of the engine load signal and the value of the engine speed signal.

25. A multi-cylinder, two-cycle internal combustion engine as recited in claim 24 wherein the number of matrix entries in the global spark ignition timing matrix is substantially more than the number of matrix entries in any one of the pre-calibrated cylinder offset spark ignition timing matrices.

26. A multi-cylinder, two-cycle internal combustion engine as recited in claim 22 further comprising:

an engine running condition sensor that generates an engine running condition signal; and wherein the electronic control unit inputs the engine running condition signal and the electronic control unit contains means for adjusting the values of the global spark ignition timing value on a global basis in accordance with the engine running condition signal.

27. A multi-cylinder, two-cycle internal combustion engine as recited in claim 26 wherein the engine running condition sensor is a knock sensor.

28. A multi-cylinder, two-cycle internal combustion engine as recited in claim 26 wherein the engine running condition sensor is a temperature sensor that senses the temperature of engine coolant flowing through the engine block.

29. A multi-cylinder, two-cycle internal combustion engine as recited in claim 26 wherein the engine running condition sensor is a sensor that measures emission quality of engine exhaust.

30. A multi-cylinder, two-cycle internal combustion engine as recited in claim 26 wherein the engine running condition sensor is a combustion quality sensor that measures the quality of combustion within one or more of the engine cylinders.

31. A multi-cylinder, two-stroke internal combustion engine comprising:

a plurality of engine cylinders each coextensive with a respective combustion chamber;

a cylinder spark ignition system for each cylinder, each cylinder spark ignition system having a spark plug mounted to the engine so that a spark plug ignition electrode is exposed within the respective combustion chamber and a dedicated ignition coil and electronic driver for each spark plug;

an engine load sensor that monitors engine load and generates an engine load signal in response thereto;

an engine rpm sensor that monitors an engine revolution rate and generates an engine rpm signal in response thereto; and an electronic control unit that inputs the rpm signal and the engine load signal and generates a cylinder-specific ignition coil dwell time control signal that is transmitted to the respective electronic driver to control ignition coil dwell time for the respective ignition coil, wherein the electronic control unit determines ignition coil dwell time for each respective ignition coil based on cylinder-specific characteristics; and wherein the electronic control unit contains:

a global ignition coil dwell time matrix from which a global value for ignition coil dwell time is determined from the value of the engine load signal and the value of the engine speed signal;

a plurality of pre-calibrated cylinder offset ignition coil dwell time matrices from which cylinder-specific offset values for adjusting ignition coil dwell times from the global value are determined; and means for combining the global value with the cylinder-specific offset values to generate cylinder-specific ignition coil dwell time control signals.

32. A multi-cylinder, two-cycle internal combustion engine as recited in claim 31 further comprising:

an engine running condition sensor that generates an engine running condition signal; and wherein the electronic control unit inputs the engine running condition signal and the electronic control unit contains means for adjusting the values of the global ignition coil dwell time value on a global basis in accordance with the engine running condition signal.

* * * * *